United States Patent
Norrman et al.

(10) Patent No.: US 12,132,619 B2
(45) Date of Patent: Oct. 29, 2024

(54) METHODS, APPARATUS AND MACHINE-READABLE MEDIA RELATING TO MACHINE-LEARNING IN A COMMUNICATION NETWORK

(71) Applicant: Telefonaktiebolaget LM Ericsson (publ), Stockholm (SE)

(72) Inventors: Karl Norrman, Stockholm (SE); Martin Isaksson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/635,332

(22) PCT Filed: Aug. 6, 2020

(86) PCT No.: PCT/EP2020/072122
§ 371 (c)(1),
(2) Date: Feb. 14, 2022

(87) PCT Pub. No.: WO2021/032497
PCT Pub. Date: Feb. 25, 2021

(65) Prior Publication Data
US 2022/0321423 A1    Oct. 6, 2022

Related U.S. Application Data

(60) Provisional application No. 62/887,854, filed on Aug. 16, 2019.

(51) Int. Cl.
*H04L 41/16*     (2022.01)
*G06N 20/00*     (2019.01)
(Continued)

(52) U.S. Cl.
CPC ............ *H04L 41/16* (2013.01); *G06N 20/00* (2019.01); *H04L 41/0893* (2013.01); *H04L 41/12* (2013.01)

(58) Field of Classification Search
None
See application file for complete search history.

(56) References Cited

U.S. PATENT DOCUMENTS 10,824,474 B1   11/2020   Kamboj et al.
10,862,770 B2   12/2020   Lu
(Continued)

OTHER PUBLICATIONS

International Search Report and Written Opinion of the International Searching Authority for PCT International Application No. PCT/EP2020/072122 dated Nov. 6, 2020.
(Continued)

*Primary Examiner* — Shirley X Zhang
(74) *Attorney, Agent, or Firm* — Sage Patent Group

(57) ABSTRACT

A method performed by a first network entity in a communications network is provided. The method comprises receiving a request from a second network entity, the request comprising one or more selection criteria for selecting network entities to participate in a collaborative learning process to train a model using a machine learning algorithm. The method further comprises transmitting a response message comprising an indication of whether or not the first network entity satisfies the one or more selection criteria.

18 Claims, 10 Drawing Sheets

(51) Int. Cl.
  *G06N 20/20* (2019.01)
  *H04L 41/0893* (2022.01)
  *H04L 41/12* (2022.01)

(56) References Cited

U.S. PATENT DOCUMENTS

| | | | |
|---|---|---|---|
| 11,109,307 | B2 | 8/2021 | Bartolom et al. |
| 11,283,687 | B2 | 3/2022 | Wang |
| 11,537,439 | B1* | 12/2022 | Liberty ............... G06F 9/5077 |
| 11,785,535 | B2 | 10/2023 | Wang |
| 11,832,169 | B2 | 11/2023 | Bartolom et al. |
| 2014/0222730 | A1 | 8/2014 | Vassuer et al. |
| 2018/0150524 | A1 | 5/2018 | Anger et al. |
| 2018/0307624 | A1* | 10/2018 | Zmora ................ G06N 3/045 |
| 2019/0205745 | A1* | 7/2019 | Sridharan ............. G06N 3/08 |
| 2019/0220703 | A1 | 7/2019 | Prakash et al. |
| 2019/0238443 | A1 | 8/2019 | Di Pietro et al. |
| 2019/0324805 | A1* | 10/2019 | Peng ................. G06N 20/00 |
| 2020/0314672 | A1 | 10/2020 | Farooq |
| 2020/0410288 | A1* | 12/2020 | Capota ............... G06F 21/6245 |
| 2021/0014114 | A1* | 1/2021 | Doshi ................ H04L 41/5019 |
| 2021/0168055 | A1 | 6/2021 | Lair |
| 2021/0326185 | A1* | 10/2021 | Opsenica ............ G06F 9/5077 |
| 2022/0052925 | A1 | 2/2022 | Vandikas et al. |
| 2022/0159433 | A1 | 5/2022 | Flick |
| 2022/0292398 | A1* | 9/2022 | Norrman ............. H04L 41/16 |
| 2022/0294706 | A1* | 9/2022 | Norrman ............. H04L 41/16 |
| 2022/0303886 | A1 | 9/2022 | Theimer |
| 2022/0321423 | A1 | 10/2022 | Norrman |

OTHER PUBLICATIONS

Nishio et al., "Client Selection for Federated Learning with Heterogeneous Resources in Mobile Edge," Proceedings of the IEEE ICC 2019, Shanghai, China, May 2019, 7 pages.

Yoshida et al., "Hybrid-FL for Wireless Networks: Cooperative Learning Mechanism Using Non-IID Data," Proceedings of the IEEE ICC 2019, Dublin, Ireland, Jun. 2020, 7 pages.

Bonawitz et al., "Towards Federated Learning at Scale: System Design," Proceedings of the 2nd SysML Conference, Palo Alto, CA, USA, 2019, 15 pages.

McMahan et al., "Communication-Efficient Learning of Deep Networks from Decentralized Data," Proceedings of the 20th International Conference on Artificial Intelligence and Statistics (AISTATS) 2017, 11 pages.

3GPP TS 23.288 V16.0.0, "3rd Generation Partnership Project; Technical Specification Group Services and System Aspects; Architecture enhancements for 5G System (5GS) to support network data analytics services (Release 16)," Jun. 2019, 52 pages.

3GPP TR 23.791 V16.1.0, "3rd Generation Partnership Project; Technical Specification Group Services and System Aspects; Study of Enablers for Network Automation for 5G (Release 16)," Mar. 2019, 124 pages.

3GPP TS 28.550 V16.1.0, "3rd Generation Partnership Project; Technical Specification Group Services and System Aspects; Management and orchestration; Performance assurance (Release 16)," Jun. 2019, 81 pages.

3GPP TS 23.288 V0.4.0, "3rd Generation Partnership Project; Technical Specification Group Services and System Aspects; Architecture enhancements for 5G System (5GS) to support network data analytics services (Release 16)," 48 pages.

3GPP TS 23.502 V16.0.2, "3rd Generation Partnership Project; Technical Specification Group Services and System Aspects; Procedures for the 5G System; Stage 2 (Release 16)," Apr. 2019, 419 pages.

3GPP TS 23.502 V16.1.1, "3rd Generation Partnership Project; Technical Specification Group Services and System Aspects; Procedures for the 5G System; Stage 2 (Release 16)," Jun. 2019, 495 pages.

China Mobile, "KI #2, New Sol, Federated Learning among Multiple NWDAF Instances," S2-2004029r03, 3GPP TSG-WG SA2 Meeting #139E e-meeting, Elbonia, Jun. 1-12, 2020, 5 pages.

Bonawitz et al., "Practical Secure Aggregation for Privacy-Preserving Machine Learning," CCS '17: Proceedings of the 2017 ACM SIGSAC Conference on Computer and Communications Security, Oct. 2017, 21 pages.

Isaksson et al., "Secure Federated Learning in 5G Mobile Networks," Globecom 2020—2020 IEEE Global Communications Conference, Taipei, Taiwan, 2020, 7 pages.

International Search Report and Written Opinion of the International Searching Authority for PCT International Application No. PCT/EP2020/072123 dated Nov. 9, 2020.

Niknam et al., "Federated Learning for Wireless Communications: Motivation, Opportunities and Challenges," Jun. 2020, IEEE Communications Magazine 58(6), 6 pages.

3GPP TS 29.510 V16.0.0, "3rd Generation Partnership Project; Technical Specification Group Core Network and Terminals; 5G System; Network Function Repository Services; Stage 3 (Release 16)," Jun. 2019, 135 pages.

Office Action for Chinese Patent Application No. 202080057773.7 dated Nov. 29, 2023, 9 pages.

Office Action, U.S. Appl. No. 17/635,235, mailed Sep. 5, 2024, 14 pages.

\* cited by examiner

METHODS, APPARATUS AND MACHINE-READABLE MEDIA RELATING TO MACHINE-LEARNING IN A COMMUNICATION NETWORK

CROSS REFERENCE TO RELATED APPLICATIONS

This application is a 35 U.S.C. § 371 national stage application of PCT International Application No. PCT/EP2020/072122 filed on Aug. 6, 2020, which claims the benefit of U.S. Provisional Patent Application Ser. No. 62/887,854, filed on Aug. 16, 2019, the disclosures and content of which are incorporated by reference herein in their entireties.

TECHNICAL FIELD

Embodiments of the disclosure relate to machine-learning, and particularly to methods, apparatus and machine-readable media relating to machine-learning in a communication network.

BACKGROUND

In a typical wireless communication network, wireless devices are connected to a core network via a radio access network. In a fifth generation (5G) wireless communication network, the core network operates according to a Service Based Architecture (SBA), in which services are provided by network functions via defined application interfaces (APIs). Network functions in the core network use a common protocol framework based on Hypertext Transfer Protocol 2 (HTTP/2). As well as providing services, a network function can also invoke services in other network functions through these APIs. Examples of core network functions in the 5G architecture include the Access and mobility Management Function (AMF), Authentication Server Function (AUSF), Session Management Function (SMF), Policy Charging Function (PCF), Unified Data Management (UDM) and Operations, Administration and Management (OAM). For example, an AMF may request subscriber authentication data from an AUSF by calling a function in the API of an AUSF for this purpose.

Efforts are being made to automate 5G networks, with the aim of providing fully automated wireless communication networks with zero touch (i.e. networks that require as little human intervention during operation as possible). One way of achieving this is to use the vast amounts of data collected in wireless communication networks in combination with machine-learning algorithms to develop models for use in providing network services.

A Network Data Analytics (NWDA) framework has been established for defining the mechanisms and associated functions for data collection in 5G networks. Further enhancements to this framework are described in the 3GPP document TS 23.288 v 16.0.0. The NWDA framework is centred on a Network Data Analytics Function (NWDAF) that collects data from other network functions in the network. The NWDAF also provides services to service consumers (e.g. other network functions). The services include, for example, retrieving data or making predictions based on data collated at the NWDAF.

FIG. 1 shows an NWDAF 102 connected to a network function (NF) 104. As illustrated, the network function 104 may be any suitable network function (e.g. an AMF, an AUSF or any other network function). In order to collect data from the network function 104, the NWDAF 102 connects to an Event Exposure Function at the network function over an Nnf reference point (as detailed in the 3GPP documents TS 23.502 v 16.0.2 and TS 23.288 v 16.0.0). The NWDAF 102 can then receive data from the network function over the Nnf reference point by subscribing to reports from the network function or by requesting data from the network function. The timing of any reports may be determined by timeouts (e.g. expiry of a timer) or may be triggered by events (e.g. receipt of a request). The types of data that can be requested by the NWDAF 102 from the network function may be standardised.

For the network function 104 to be discoverable by the NWDAF 102 (or any other service consumer such as, for example, another network function), the network function 104 registers with a Network function Repository Function (NRF).

FIG. 2 shows an illustration of an NRF 208 connected to three network functions, NF A 202, NF B 204 and NF C 206 that are registered at the NRF 208. The NRF 208 may be preconfigured with information about the network functions 202-206, or each of the network functions 202-206 may have performed a network registration procedure with the NRF 208 to register at the NRF 208. Once a network function is registered at the NRF 208, another entity in the network may discover the network function by calling a discovery function at the NRF 208. Thus, for example, NF B 204 may discover NF A 202 and NF C 206 by calling a discovery function at the NRF 208.

As noted above, data collection has the potential to be a powerful tool for 5G networks when coupled with machine-learning. Machine-learning in the context of 5G networks is typically large-scale and may be executed in a cloud (virtualised) environment where performance and security are prioritised. In practice, this means that the data available for training models using machine-learning may be distributed across many entities in the network, and that data should ideally be collated at one network entity to be used for developing models using machine-learning. Collating these datasets at a single network entity can be slow and resource intensive, which is problematic for time-critical applications. In addition, some applications require the use of data sets comprising sensitive or private data, and collating these data at a single network entity may have security implications.

SUMMARY

Embodiments of the disclosure address these and other problems.

In one aspect, a method performed by a network entity is provided. The method comprises obtaining identification information for a plurality of candidate network entities in the communications network, wherein the identification information indicates that each of the candidate network entities is configured to participate in collaborative learning. The network entity sends a request for each of the candidate network entities, the request comprising one or more selection criteria. The network entity receives one or more response messages comprising an indication of which of the candidate network entities satisfy the one or more selection criteria; and based on the indication in the one or more response messages, selects one or more of the plurality of candidate network entities to participate in a collaborative learning process to train a model using a machine learning algorithm.

In a further aspect, the disclosure provides a network entity to perform the method recited above. A further aspect provides a computer program for performing the method recited above. A computer program product, comprising the computer program, is also provided.

In another aspect, a method performed by a first network entity in a communications network is provided, in which the first network entity belongs to a plurality of network entities configured to participate in collaborative learning. The method comprises receiving a request from a second network entity in the communications network, wherein the request comprises one or more selection criteria for selecting network entities to participate in a collaborative learning process to train a model using a machine learning algorithm. The method further comprises transmitting, to the second network entity in the communications network, a response message comprising an indication of whether or not the first network entity satisfies the one or more selection criteria.

In a further aspect, the disclosure provides a first network entity to perform the method recited above. A further aspect provides a computer program for performing the method recited above. A computer program product, comprising the computer program, is also provided.

Another aspect provides a network entity for a communications network. The network entity comprising processing circuitry and a non-transitory machine-readable medium storing instructions which, when executed by the processing circuitry, cause the network entity to: obtain identification information for a plurality of candidate network entities in the communications network, the identification information indicating that each of the candidate network entities is configured to participate in collaborative learning; send a request for each of the candidate network entities, the request comprising one or more selection criteria; receive one or more response messages comprising an indication of which of the candidate network entities satisfy the one or more selection criteria; and based on the indication in the one or more response messages, select one or more of the plurality of candidate network entities to participate in a collaborative learning process to train a model using a machine learning algorithm.

Another aspect provides a first network entity for a communications network, wherein the first network entity belongs to a plurality of network entities configured to participate in collaborative learning. The first network entity comprises processing circuitry and a non-transitory machine-readable medium storing instructions which, when executed by the processing circuitry, cause the first network entity to: receive a request from a second network entity in the communications network, the request comprising one or more selection criteria for selecting network entities to participate in a collaborative learning process to train a model using a machine learning algorithm; and transmit, to the second network entity in the communications network, a response message comprising an indication of whether or not the first network entity satisfies the one or more selection criteria.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
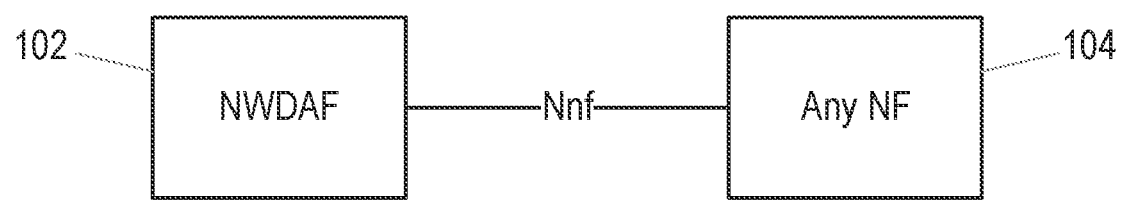
FIG. 1 shows a network data analytics function connected to a network function.
Figure 2:
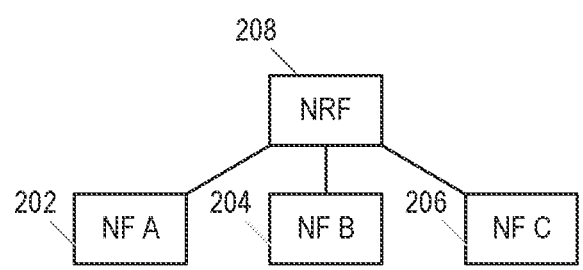
FIG. 2 shows a network function repository function connected to three network functions.
Figure 3:
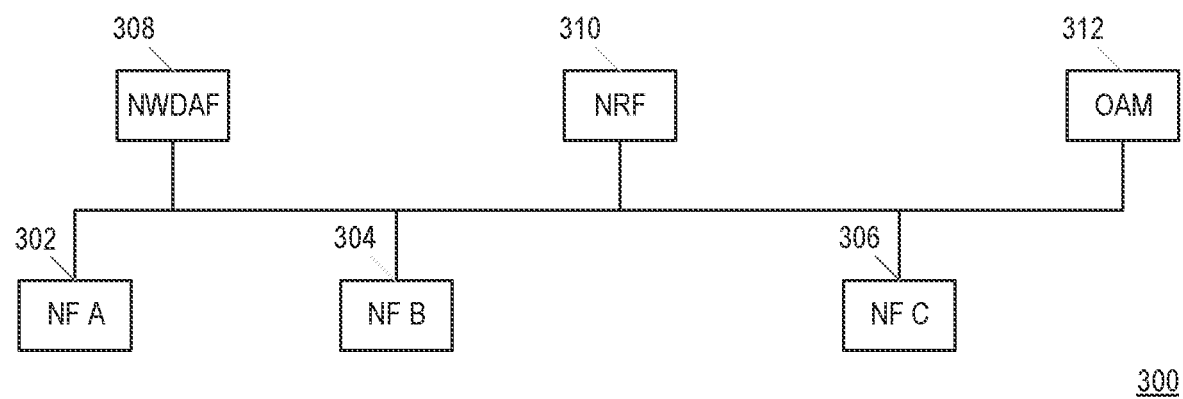
FIG. 3 shows a system according to embodiments of the disclosure.

FIG. 3 shows a system 300 in a communication network according to embodiments of the present disclosure. One or more entities of the system may, for example, form part of a core network in the communication network. The core network may be a Fifth Generation (5G) Core Network (5GCN). The communication network may implement any suitable communications protocol or technology, such as Global System for Mobile communication (GSM), Wideband Code-Division Multiple Access (WCDMA), Long Term Evolution (LTE), New Radio (NR), WiFi, WiMAX, or Bluetooth wireless technologies. In one particular example, the network forms part of a cellular telecommunications network, such as the type developed by the $3^{rd}$ Generation Partnership Project (3GPP). Those skilled in the art will appreciate that the system 300 may comprise further components that are omitted from FIG. 3 for the purposes of clarity.

The system 300 comprises at least two network entities or network functions (NFs). In the illustrated embodiment, three network entities, NF A 302, NF B 304 and NF C 306, are shown, although the skilled person will appreciate that the system 300 may comprise many more network entities than shown. The network entities 302-306 are configured to provide one or more services. The network entities may be any type or combination of types of network entities or network functions. For example, one or more of the network entities 302-306 may comprise core network entities or functions such as an access and mobility management function (AMF), an authentication server function (AUSF), a session management function (SMF), a policy control function (PCF), and/or a unified data management (UDM) function. Alternatively or additionally, one or more of the network entities 302-306 may be implemented within entities outside the core network, such as radio access network nodes (e.g., base stations such as gNBs, eNBs etc or parts thereof, such as central units or distributed units). The network entities 302-306 may be implemented in hardware, software, or a combination of hardware and software.

Each of the network entities 302-306 is registered at a network registration entity 310 that also forms part of the system 300. In this example, the network registration entity is a Network function Repository Function (NRF) 310. However, the skilled person will appreciate that the network registration entity may be any suitable network entity that provides registration and discovery for network entity services. The NRF 310 may thus store information for each of the network entities 302-306 registered there. The stored information may include one or more of: a type of each of the network entities 302-306; a network address (e.g., IP address) of the network entities; services provided by the network entities; and capabilities of the network entities. Thus, once registered at the NRF 310, the network entities 302-306 are discoverable by other entities in the network.

The system 300 further comprises a Network Data and Analytics Function (NWDAF) 308. The NWDAF 308 is configured to collect network data from one or more network entities, and to provide network data analytics information to network entities which request or subscribe to receive it. For example, an NWDAF may provide information relating to network traffic or usage (e.g. predicted load information or statistics relating to historical load information). The network data analytics information provided by the NWDAF may, for example, be specific to the whole network, or to part of the network such as a network entity or a network slice. In this context, a network slice may be a logical partition (e.g. a virtual network) in the communications network. The network slice may be dedicated to a particular use-case or end-user. For example, the network slice may comprise one or more network functions for a particular use-case or end-user. In particular examples, a network slice may be defined in hardware. For example, the network slice may comprise a set of servers dedicated for a particular use-case or end-user. The network slice may be isolated from or independent of other parts of the communication network. For example, the transfer of information between a network slice and other parts of the communication network (e.g. other network slices) may be prohibited or restricted.

The network data analytics information provided by the NWDAF 308 may comprise forecasting data (e.g. an indication of a predicted load for a network function) and/or historical data (e.g. an average number of wireless devices in a cell in the communication network). The network data analytics information provided by the NWDAF may include, for example, performance information (e.g. a ratio of successful handovers to failed handovers, ratio of successful setups of Protocol Data Unit (PDU) Sessions to failed setups, a number of wireless devices in an area, an indication of resource usage etc.).

As described above, communication networks are becoming increasingly automated, with network designers seeking to minimise the level of human intervention required during operation. One way of achieving this is to use the data collected in communication networks to train models using machine-learning, and to use those models in the control of the communication network. As communication networks continue to obtain data during operation, the models can be updated and adapted to suit the needs of the network. However, as noted above, conventional methods for implementing machine-learning in communication networks require collating data for training models at one network entity. Collating these data at a single network entity, such as the NWDAF 308, can be slow and resource intensive and may be problematic if the data is sensitive in nature.

Aspects of the disclosure address these and other problems.

In one aspect, a collaborative (e.g. federated) learning process is used to train a model using machine-learning. Rather than collating training data for training the model at a single network entity, instances of the model are trained locally at multiple network functions to obtain local updates to parameters of the model at each network entity. The local model updates are collated at an aggregator network entity (such as the NWDAF) and combined to obtain a combined model update. In this way, data from across multiple entities in a communication network are used to train a model using machine-learning, whilst minimising resource overhead and reducing security risks.

Accordingly, in the system 300 illustrated in FIG. 3, the NWDAF 308 initiates training of a model using machine-learning at each of the network functions, NF A 302, NF B 304 and NF C 306. For example, the NWDAF 308 may transmit a message to each of the network functions 302-306 instructing the network function to train a model using machine-learning. The message may comprise a copy of the model (e.g. a global copy that is common to each of the network functions 302-306), or each of the network functions 302-306 may be preconfigured with a copy of the model. In the latter case, the message may comprise an indicator of which model is to be trained. The message may specify a type of machine-learning algorithm to be used by the network entities. Alternatively, the network entities 302-306 may be preconfigured with the type of machine-learning algorithm to be used for a model.

On receipt of the message from the NWDAF 308, each network entity 302-306 trains the model by inputting training data into the machine-learning algorithm to obtain a local model update to values of one or more parameters of the model. The training data may be data that is unique to the network entity. For example, the training data may comprise data obtained from measurements performed by the network function and/or data collected by the network function from other network entities (e.g. data obtained from measurements performed by one or more other network entities).

Each of the network entities 302-306 transmits the local model update to the NWDAF 308. The local model update may comprise updated values of the parameters of the model or the local model update may comprise an indication of a change in the values of the parameters of the model, e.g., differences between previous values for the parameters and updated values for the parameters.

Transmissions between the network entities 302-306 and the NWDAF 308 may be direct (e.g. the NWDAF 308 transmits directly to a network entity) or the transmissions may be via an intermediate network entity. For example, the transmission between the network functions 302-306 and the NWDAF 308 may be via an Operation, Administration and Management function (OAM) 312.

The NWDAF 308 thus receives the local model updates from each of the network entities 302-306. The NWDAF 308 combines the model updates received from the network entities 302-306 to obtain a combined model update. The NWDAF 308 may use any suitable operation for combining the model updates. For example, the NWDAF 308 may average the received local model updates to obtain an average model update. In a further example, the average may be a weighted average, with updates from different network entities being assigned different weights.

The NWDAF 308 transmits the combined model update to one or more network entities in the network. For example, the NWDAF 308 may send the combined model update to each of the network entities 302-306. In particular examples, the combined model update may be transmitted to one or more further network entities in addition to the network entities 302-306 used to train the model.

This process may be repeated one or more times. For example, the process may be repeated until the local model updates received from each of the network entities 302-306 are consistent with each other to within a predetermined degree of tolerance. In another example, the process may be repeated until the combined model updates converge, i.e. a combined model update is consistent with a previous combined model update to within a predetermined degree of tolerance.

Collaborative (e.g. federated) learning may thus be applied to communication networks (and in particular, to a core network in a communication network) to reduce latency, minimise resource overhead and reduce the risk of security problems.

As noted above, as part of this application of collaborative learning to a communication network, a network entity initiates training of a machine-learning model at a plurality of other network entities in the communication network. However, communication networks often comprise large numbers of network entities and only a fraction of these network entities may be configured to support collaborative learning. In addition, participation in training of a particular model with a particular machine-learning algorithm may be associated with specific hardware or software requirements that only a subset of network entities satisfy.

Embodiments of the disclosure provide methods, apparatus and machine-readable media for selecting network entities for performing collaborative learning. In particular, a co-ordination network entity in a communications network transmits a request message to a network registration entity in the communications network, for identification information for a plurality of candidate network entities in the communications network capable of performing collaborative learning. The co-ordination entity then receives identification information for a plurality of candidate network entities from the network registration entity and initiates, at one or more network entities of the plurality of candidate network entities, training of a model using a machine-learning algorithm as part of a collaborative learning process.

The embodiments described herein thus provide an efficient method for selecting network entities to perform a collaborative learning process. In particular, by sending queries for candidate network entities to determine which of the candidate network entities satisfy one or more selection criteria, the embodiments described herein provide an efficient and reliable method for identifying candidates that are capable of performing a collaborative learning process. Embodiments of the disclosure thus provide a more reliable method of selecting network entities for the performance of collaborative learning in a communications network.

Figure 4:
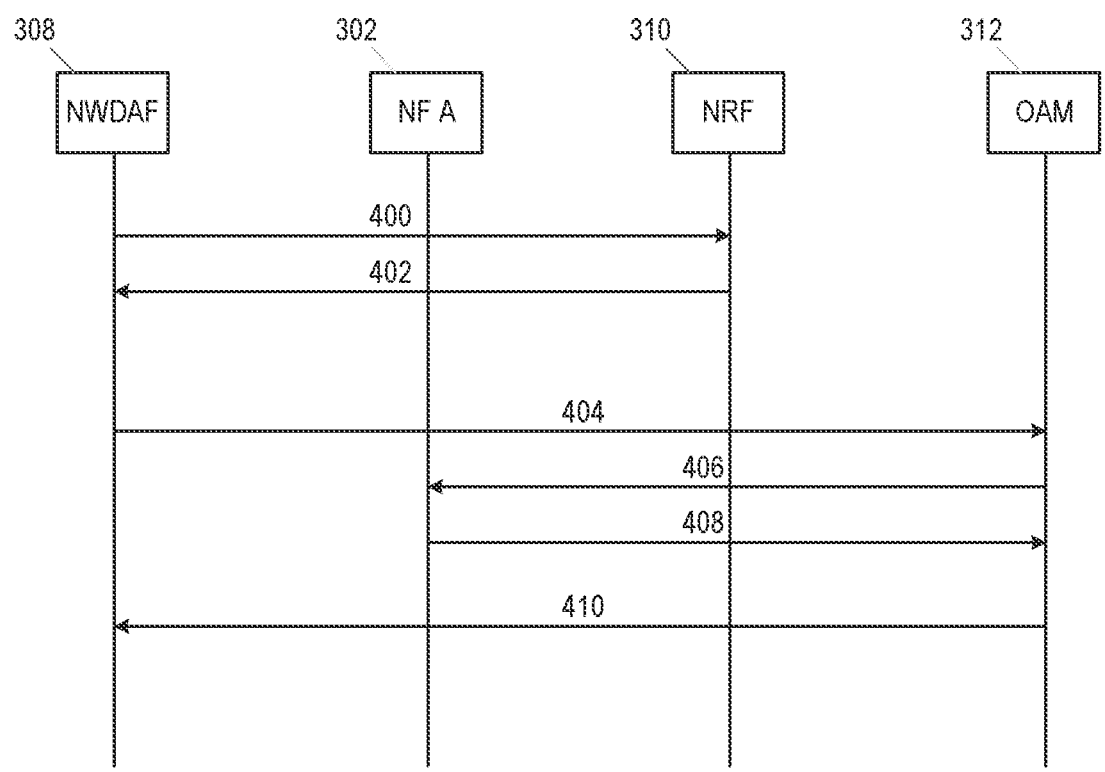
FIG. 4 is a schematic signalling diagram according to embodiments of the disclosure.

FIG. 4 is a schematic signalling diagram according to embodiments of the disclosure. The signalling involves a co-ordination network entity, a network registration entity, and a network entity or function. The co-ordination network entity may comprise an NWDAF, such as the NWDAF 308 described above with respect to FIG. 3. The network registration entity may comprise an NRF, such as the NRF 310 described above with respect to FIG. 3. In the illustrated embodiment, the signalling also involves an OAM, such as the OAM 312 described above with respect to FIG. 3. However, other embodiments may not involve the OAM. The signalling shown in FIG. 4 permits the co-ordination network entity (hereinafter, the NWDAF 308) to select one or more network entities to participate in a collaborative learning process such as federated learning. Thus the signalling in FIG. 4 may be performed upon the NWDAF 308 deciding to develop, or further train, a model.

Prior to the signalling shown in FIG. 4, one or more network entities (including NF A 302 shown in the illustration) register with the NRF 310. In registering with the NRF 310, a network entity provides information relating to the services provided by the network entity (such as the type of network entity or the function performed thereby), and/or the capability of the network entity. Such information may be stored by the NRF 310, and associated with an identifier (e.g., a unique number within the network) allowing the network entity to be identified and addressed. Further information regarding the stored information and the identifier is set out below.

The procedure begins with the NWDAF 308 transmitting, to the NRF 310, a first request message 400 for identification information for a plurality of candidate network entities in the communications network capable of performing collaborative learning. The first request message 400 may be sent directly from the NWDAF 308 to the NRF 310 (as illustrated) or indirectly via one or more intermediate entities in the communication network. The first request message 400 thus comprises a request that the NRF 310 provide a list of network entities which are capable of performing collaborative learning (such as federated learning).

The first request message 400 may comprise one or more first selection criteria for selecting candidate network entities for performing a collaborative learning process. The one or more first selection criteria may comprise at least one primary criterion relating to a capability of the candidate network entity to perform the collaborative learning process.

The at least one primary criterion may specify one or more particular types of network entity. For example, the first request message 400 may indicate that each of the candidate network entities must be an Access and Mobility management Function (AMF), or a dedicated machine-learning network function. The at least one primary criterion may, additionally or alternatively, specify a service available at or provided by each of the candidate network entities. That is, the first request message 400 may specify that each network entity selected as a candidate network entity is capable of providing a particular service. For example, the first request message 400 may specify that each network entity selected as a candidate network entity is capable of providing subscriber authentication data, or a particular type of collaborative learning.

The at least one primary criterion may relate to hardware and/or software requirements for the candidate network entities. For example, the at least one primary criterion may specify that each candidate network entity must have a graphical processing unit (GPU) or other suitable hardware available for training a model using machine-learning.

Additionally or alternatively, the one or more first selection criteria in the first request message 400 may comprise at least one secondary criterion relating to a capability of the candidate network entity to support a type of query. That is, the at least one secondary criterion relates to whether or not the candidate network entity is configured to respond to a particular type of query. Examples of different types of queries are discussed in more detail below, but may include, for example, queries from particular types of network entities (such as the NWDAF 308 or the OAM 312), and/or queries for particular types of information.

The NRF 310 identifies, from a plurality of network entities registered at the network registration entity, two or more candidate network entities capable of performing collaborative learning. The two or more candidate network entities may be, for example, in a core network of the communications network. Alternatively, at least one of the two or more candidate network entities may be, for example, in another part of the communications network (e.g. a radio access network, a backhaul network etc.).

The NRF 310 may store a profile for each network entity that is registered with it. Each profile may comprise information relating to the services provided by the network entity (such as the type of network entity or the function performed thereby), and/or the capability of the network entity. Such information may be stored by the NRF 310, and associated with an identifier (e.g., a unique number within the network) or some other means allowing the network entity to be identified and addressed. The profile may comprise an indication of one or more services that the network entity is capable of providing. For example, a profile may indicate the type of the network entity, e.g., that the network entity is a PCF, an ASF, or a dedicated machine-learning network function or entity.

The capability information may comprise an indication of whether or not the network entity is capable of performing collaborative (e.g. federated) learning. Thus, the NRF 310 may use the profiles for the plurality of network entities registered at the network registration entity to identify network entities that are capable of performing collaborative learning.

The capability information included in the profiles of network entities registered at the NRF 310 may further comprise an indication of whether or not the network entity is configured to respond to a type of query. For example, the profile for a network entity may specify that the network entity is capable of responding to queries using a protocol and/or format used by a particular type of network entity, e.g., from the NWDAF 308, or the OAM 312. Additionally or alternatively, the profile for a network entity may specify that the network entity is capable of responding to queries relating to the storage available at the network entity.

As described above, the first request message 400 may comprise one or more first selection criteria for selecting a candidate network entity from the two or more network entities for training a model using machine-learning as part of a collaborative learning process. Thus, the NRF 310 may, as part of identifying the two or more candidate network entities that are capable of performing collaborative learning, identify two or more candidate network entities that satisfy the one or more first selection criteria by searching the profiles of the network entities registered with it.

The NRF 310 transmits, in a first response message 402, an indication of the two or more candidate network entities to the NWDAF 308. For example, the indication may comprise identification information for each of the two or more candidate network entities. The first response message 402 may further include addressing information for the two or more candidate network entities (e.g. information enabling the two or more candidate network entities to be addressed in the communication network). The identification information may correspond to the addressing information. For example, the identifier stored in the profile may correspond to the identification information and/or addressing information for the network entities.

In some embodiments, after receiving the indication of the two or more candidate network entities from the NRF 310, the NWDAF 308 initiates, at the two or more candidate network entities, training of a model using a machine-learning algorithm as part of a collaborative learning process. For example, the NWDAF 308 may send a trigger message to each of the candidate network entities instructing the candidate network entity to train the model using the machine-learning algorithm. The trigger message may, for example, include information relating to the model (e.g. model parameters and/or identifying information for the model) and/or an indication of the machine-learning algorithm to be used. Alternatively, the candidate network entities may be preconfigured with some or all of this information.

In other embodiments, however, the NWDAF 308 transmits a second request message 404 comprising at least one query for additional information for each candidate network entity in the two or more candidate network entities. The at least one query may comprise one or more second selection criteria for selecting candidate network entities.

In embodiments in which the first request message 400 comprises at least one secondary criterion relating to a capability of a candidate network entity to support a type of query, the second request message 404 may comprise a query of the type specified in the first request message 400. Thus, for example, if the first request message 400 comprises a criterion specifying that candidate network entities must be capable of responding to queries relating to hardware at the candidate network entity, then the second request message 404 may specify that the candidate network entity has a particular type of hardware (e.g. a graphical processing unit).

Those skilled in the art will appreciate that the at least one query may take any suitable form. For example, the at least one query may comprise Event Filter Information as described, for example, in TS 23.502 v 16.1.1. Other suitable formats for a query may be found, for example, in TS 28.550 v 16.1.0, although the skilled person will appreciate that the disclosure is not limited as such.

The at least one query may relate to a configuration of the candidate network entity, e.g., what hardware and/or software is present at or utilized by the candidate network entity. For example, the at least one query may request information relating to a number of graphical processing units (GPUs) at the candidate network entity. In another example, the at least one query may comprise one or more second selection criteria specifying a minimum number of graphical processing units (GPUs) at the candidate network entity. In another example, the at least one query may comprise one or more selection criteria specifying a particular software version to be supported by the candidate network entity. Examples of queries relating to the configuration of a candidate network entity include queries relating to one or more of the following: software versions, licences, neighbour relations, one or more configuration parameters, and a type and/or quantity of hardware and/or software at the candidate network entity.

In particular embodiments, the at least one query relating to the configuration of a candidate network entity may relate to computational resources available at the candidate network entity. In this context, computational resources may include, for example, memory (e.g. random-access memory or storage) available at the network entity, processing power at the network entity, and/or any other suitable computational resources. For example, the at least one query may comprise a second selection criterion specifying that a candidate network entity has a minimum amount of memory available. In another example, the at least one query may comprise a second selection criterion specifying that a candidate network entity has a minimum amount of processing power available.

The at least one query for a candidate network entity may, additionally or alternatively, relate to a performance requirement for the candidate network entity. Queries relating to a performance requirement may include, for example, queries relating to a performance measurement (PM) procedure, a key performance indicator (KPI) and/or any other suitable performance metric for the candidate network entity. The one or more second selection criteria may thus relate to threshold values for a particular performance measurement, key performance indicator and/other performance metric.

The performance requirement may relate to a historical or predicted performance of the candidate network entity. The performance requirement may relate to, for example, usage of a service provided by the candidate network entity (e.g. a number of users of a service, a number of times a service has been used), traffic flow for the network entity and/or resources used by the candidate network entity (e.g. memory, processing power and/or network resources). The performance requirement may be specific to a particular time period. For example, the performance requirement may specify a minimum number of predicted users for the next hour. In another example, the performance requirement may specify a threshold number of average users during the time period 12:00-12:15 in the last week.

The at least one query for a candidate network entity may relate to an availability of training data at the candidate network entity. In order to train a model using a machine-learning algorithm, a network entity inputs data (training data) into a machine-learning algorithm. Training data for a candidate network entity may, for example, comprise data obtained from measurements performed by the candidate network entity and/or data collected by the candidate network entity from other network entities (e.g. data obtained from measurements performed by one or more other network entities). A candidate network entity that supports queries relating to an availability of training data may be configured to, in response to receiving a query of this type, indicate whether suitable training data is available at the candidate network entity. For example, a query may relate to a quantity, age (i.e. an indication of when the data was measured or obtained), quantity or content of training data at the candidate network entity. Thus, for example, a candidate network entity may receive a query for information regarding the quantity of training data at the candidate network entity, and the candidate network entity may respond with an indication of a number of data samples available at the candidate network entity.

The at least one query for a candidate network entity may relate to the performance of the candidate network entity in training a model using machine-learning. Thus, a candidate network entity may be configured to, in response to receiving a query of this type, obtain one or more metrics indicative of a performance of a preliminary model developed using the machine-learning algorithm. That is, the candidate network entity may be configured to use a validation or test data set to test the performance of a model developed at that candidate network entity. The validation or test data set may be a subset of training data available at the candidate network entity. Alternatively, the validation or test data set may be provided (e.g. by the NWDAF 308) to the candidate network entity. The metrics may comprise an indicator of the accuracy and/or precision of the model. The metrics may, additionally or alternatively, be indicative of the efficiency of training the model at the candidate network entity. For example, the metrics may comprise an indicator of the resources used at the candidate network entity to train the preliminary model (memory, processing power etc.) and/or the time taken (e.g. processor time, wall clock time etc.) to train the preliminary model.

The NWDAF 308 transmits the second request message 404 comprising the at least one query for additional information to the OAM 312. The NWDAF 308 may thus transmit a single second request message 404 to the OAM 312 for all of the candidate network entities. Alternatively, the NWDAF 308 may transmit two or more second request messages to the OAM 312 (e.g. one second request message per candidate network entity).

The OAM 312 receives the second request message 404 comprising the at least one query from the NWDAF 308. In some embodiments, the OAM 312 stores the required information to answer the at least one query for each of the candidate network devices (e.g. in a cache). For example, the OAM 312 may store network traffic load information for each of the candidate network devices. Thus, if the at least one query specifies that the candidate devices must have a network traffic load that is less than 50%, then the OAM 312 may determine which candidate network devices satisfy this requirement and send an indication of which candidate network devices satisfy this requirement to the NWDAF 308.

Alternatively, if the OAM 312 does not store the information required to respond to the at least one query for all of the candidate network devices, the OAM 312 may generate a third request message 406 based on the at least one query and transmit the third request message 406 to at least one of the two or more candidate network entities. The third request message 406 may comprise the at least one query, or the third request message 406 may be based at least in part on the second request message 404. The OAM 312 may, for example, store the information required to respond to part of the at least one query, but lack information required to respond to the rest of the query. For example, the at least one query may relate to an average network traffic load of the candidate network entities and an average number of users, and the OAM 312 may store the average network traffic load of the candidate network entities, but not the average number of users. Thus, the third request message 406 may comprise a request for the remaining information required to answer the query. In alternative embodiments, the OAM 312 forwards the second request message 404 to each of the candidate network entities as a third request message 406.

Each of the candidate network entities receiving the third request message 406 from the OAM 312 may send, to the OAM 312, a second response message 408 comprising the additional information requested in the at least one query. For example, the third request message 406 may comprise a query relating to a version of a type of software supported by the candidate network entity. The candidate network entity may thus indicate, in the response message 408, the software version(s) that it is configured to use.

In embodiments in which the at least one query comprises one or more second selection criteria, each of the candidate network entities that receives the third request message 406 may indicate, in a second response message 408, whether or not it complies with the one or more second selection criteria comprised in the at least one query. The candidate network entities may, for example, use one or more Boolean parameters to indicate which of the one or more second selection criteria are satisfied (e.g. the second response message 408 may comprise one Boolean parameter per second selection criterion). In one example, a candidate network entity satisfying all of the one or more second selection criteria returns a True value (e.g., a logical value of 1). In another example, a candidate network entity that does not satisfy at least one of the one or more second selection criteria returns a False value (e.g., a logical value of 0). For example, the at least one query may comprise the second selection criterion that the candidate network entity has collected at least 1000 data samples (e.g. for use in training the model). A candidate network entity that has collected only 800 data samples thus returns a False value in the second response message 408.

In particular embodiments, if the at least one query comprises one or more second selection criteria, a candidate network entity may only respond to the third request message 406 if the candidate network entity satisfies each of the one or more second selection criteria. Thus, in the aforementioned example, candidate network entities that have collected fewer than 1000 data samples may not respond to the third request message 406. The OAM 312 may thus consider a lack of a response from a candidate network entity to be an indication that the candidate network entity does not satisfy the one or more second selection criteria.

The OAM 312 thus receives a second response message 408 from one or more of the candidate network entities. The OAM 312 sends a third response message 410 to the NWDAF 308 based on the second response message 408. For example, the OAM 312 may forward the second response message 408 to the NWDAF 308 in the third response message 410. Alternatively, the OAM 312 may extract the additional information requested in the at least one query from the second response message 408 and send the additional information to the NWDAF 308 in the third response message 410.

If the at least one query comprises one or more second selection criteria, then the OAM 312 may transmit a third response message 410 to the NWDAF 308, in which the third response message 410 comprises an indication of which of the two or more candidate network entities satisfy the one or more second selection criteria. Thus, for example, the third response message 410 may comprise identification information for only the candidate network entities that satisfy the one or more second selection criteria. Alternatively, the third response message may include identification information for all of the candidate network entities initially identified to the OAM 312 (in the request message 404) along with an indication (e.g. a Boolean) as to whether each candidate network entity satisfies the one or more second selection criteria.

In particular embodiments, the OAM 312 may send an indication for only a subset of the candidate network entities meeting the one or more second selection criteria. For example, the OAM 312 may be preconfigured with a maximum number of candidate network entities to report to the NWDAF 308. Alternatively, the NWDAF 308 may indicate in the second request message 404, a maximum number of candidate network entities to report.

Thus only a subset of those network entities meeting the second selection criteria may be reported to the NWDAF 308. The OAM 312 may use any suitable method for selecting the subset of candidate network entities. The subset of candidate network entities may, for example, be chosen at random. Alternatively, the OAM 312 may select a subset of the candidate network entities based on a characteristic of the candidate network entities. Information relating to the characteristic of the candidate network entities may be stored (e.g. in a cache) at the OAM 312 or the OAM may, for example, obtain the information from the candidate network entities (e.g. in the second response messages 408).

The OAM 312 may rank the candidate network entities according to the particular characteristic and select the best (e.g. highest) ranking candidate network entities. A secure multi-party computation algorithm (e.g. a Yao's Millionaires' Problem algorithm) may be used to compare the characteristics of multiple candidate network entities whilst minimising the information shared between network entities. For example, the OAM 312 may select the subset of candidate network entities that have the largest training datasets. Thus, a secure multi-party computation algorithm may be used to determine which candidate network entities have the largest training datasets without revealing, to the OAM 312, the size of the training datasets.

In other examples, the OAM 312 may select the subset of candidate network entities based on their location in the network. For example, the OAM 312 may preferentially select candidate network entities that are in the same network slice.

Thus, in particular embodiments, the OAM 312 selects a subset of the candidate network entities based on the one or more second response messages 408 received from the candidate network entities. The OAM 312 then transmits the third response message 410 to the NWDAF. Using the third response message 410, the NWDAF 308 selects one or more of the candidate network entities to participate in the collaborative learning process to train a model using a machine-learning algorithm.

In some embodiments, the third response message 410 comprises the additional information requested in the at least one query. The NWDAF 308 may thus select the one or more candidate network entities based on the additional information. For example, if the additional information comprises an indication of the number of data samples available at each of the candidate network entities for training a model using machine-learning, the NWDAF 308 may select the one or more candidate network entities with the largest number of data samples. In another example, the NWDAF 308 may apply one or more second selection criteria (such as the one or more second selection criteria described above) to select the one or more candidate network entities. In this example, the NWDAF 308, rather than the candidate network entities, determines whether the candidate network entities satisfy the one or more second selection criteria.

The third response message 410 may comprise an indication of which of the two or more candidate network entities satisfy the one or more second selection criteria. The NWDAF 308 may thus, for example, select the candidate network entities indicated as satisfying the one or more second selection criteria to participate in the collaborative learning process.

In particular embodiments, the NWDAF 308 receives, for at least one candidate network entity of the two or more candidate network entities, one or more participation criteria for participating in the collaborative learning process. The one or more participation criteria may be included in the third response message 410, and may have been specified by the at least one candidate network entity (e.g. in the second response message 408).

The one or more participation criteria may include any suitable criteria including, for example, a requirement that a minimum threshold number of network entities participate in the collaborative learning process, a requirement that the NWDAF 308 is in a same network slice as the candidate network entity and/or a requirement that all of the network entities participating in the collaborative learning process are in a same network slice.

The NWDAF 308 may select one or more of the candidate network entities to participate in the collaborative learning process based on the one or more participation criteria. Thus, for example, if a participation criterion specified by a candidate network device is not satisfied, then the NWDAF 308 may not select that candidate network device. Conversely, the NWDAF 308 may select a candidate network device to participate in the collaborative learning process if the one or more participation criteria specified by the candidate network device are satisfied.

The NWDAF 308 may use any of the aforementioned approaches for selecting candidate network entities. The NWDAF 308 may then initiate training, at the selected candidate network entities, training of a model using a machine-learning algorithm as part of a collaborative learning process. The NWDAF 308 may send a trigger message to each of the selected candidate network entities instructing the candidate network entity to train the model using the machine-learning algorithm. The trigger message may, for example, include information relating to the model (e.g. model parameters and/or identifying information for the model) and/or an indication of the machine-learning algorithm to be used. Alternatively, the candidate network entities may be preconfigured with some or all of this information.

In the embodiment described in relation to FIG. 4, the NWDAF queries the candidate network entities by sending a query to an intermediate network entity (in this case, the OAM 312). However, those skilled in the art will appreciate that, in some embodiments, the NWDAF 308 may query the candidate network entities directly by transmitting a second request message 404 to each candidate network entity and receiving one or more responses from one or more of the candidate network entities. In such embodiments, the selection of a subset of candidate network entities at the OAM 312 may be omitted.

Figure 5:
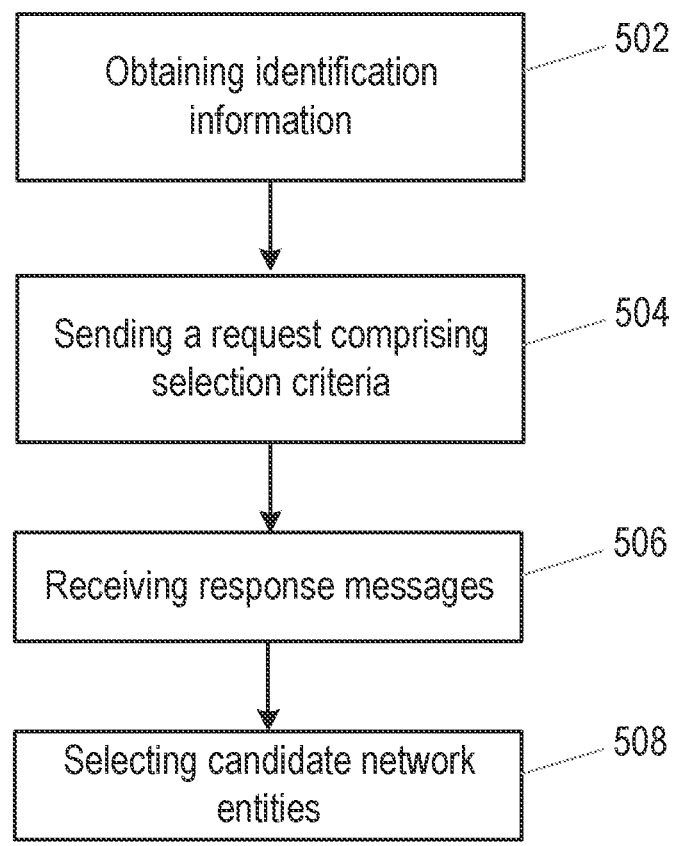
FIG. 5 is a flowchart of a method according to embodiments of the disclosure.

FIG. 5 is a flowchart of a method performed by a network entity in a communications network according to embodiments of the disclosure. The network entity may be, for example, a co-ordination network entity. The network entity may be, for example, a NWDAF, such as the NWDAF 308 described above in relation to FIG. 4.

In step 502, the network entity obtains identification information for a plurality of candidate network entities in the communications network, the identification information indicating that each of the candidate network entities is configured to participate in collaborative learning. Step 502 may correspond substantially to receipt of the first response message 402 described above with respect to FIG. 4, for example.

In step 504, the network entity sends a request for each of the candidate network entities, the request comprising one or more selection criteria. A request may be sent, for example, to each of the candidate network entities. Alternatively, the request may be sent, for example, to an intermediate node (e.g. an OAM such as the OAM 312 described above in relation to FIG. 3). Step 504 may correspond substantially to transmission of the second request message 404 described above with respect to FIG. 4, for example.

The network entity receives one or more response messages in step 506. The one or more response messages comprises an indication of which of the candidate network entities satisfy the one or more selection criteria. Step 506 may correspond substantially to receipt of the third response message 410 described above with respect to FIG. 4, for example.

In step 508, the network entity selects, based on the indication in the one or more response messages, one or more of the plurality of candidate network entities to participate in a collaborative learning process to train a model using a machine learning algorithm.

The network entity may, optionally, initiate training of the model using machine learning at each of the selected candidate network entities as part of the collaborative learning process.

Figure 6:
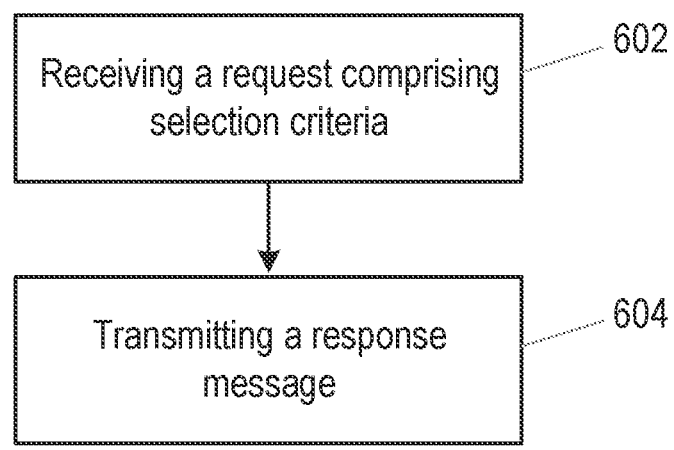
FIG. 6 is a flowchart of a method according to embodiments of the disclosure.

FIG. 6 is a flowchart of a method performed by a first network entity in a communications network according to embodiments of the disclosure. The first network entity belongs to a plurality of network entities configured to participate in collaborative learning. The plurality of network entities may comprise any combination of suitable network entities, including for example, an Access and mobility Management Function (AMF), Authentication Server Function (AUSF), Session Management Function (SMF), Policy Charging Function (PCF), Unified Data Management (UDM) and Operations, Administration and Management (OAM), an evolved Node B (eNB) and a next generated NodeB (gNB).

In step 602, the first network entity receives a request from a second network entity in the communications network. The request comprises one or more selection criteria for selecting network entities to participate in a collaborative learning process to train a model using a machine learning algorithm. One or more of the first network entity and the second network entity may be in a core network of the communications network. The second network entity may be, for example, a Network Data Analytics Function, NWDAF, (such as the NWDAF 308 described above in relation to FIG. 3) or an Operations, Administration and Management function, OAM (such as the OAM 312 described above in relation to FIG. 3). Step 602 may correspond substantially to receipt of the third request message 406 described above with respect to FIG. 4, for example.

In step 604, the first network entity transmits, to the second network entity in the communications network, a response message comprising an indication of whether or not the first network entity satisfies the one or more selection criteria. Step 604 may correspond substantially to transmission of the second response message 408 described above with respect to FIG. 4, for example.

Figure 7:
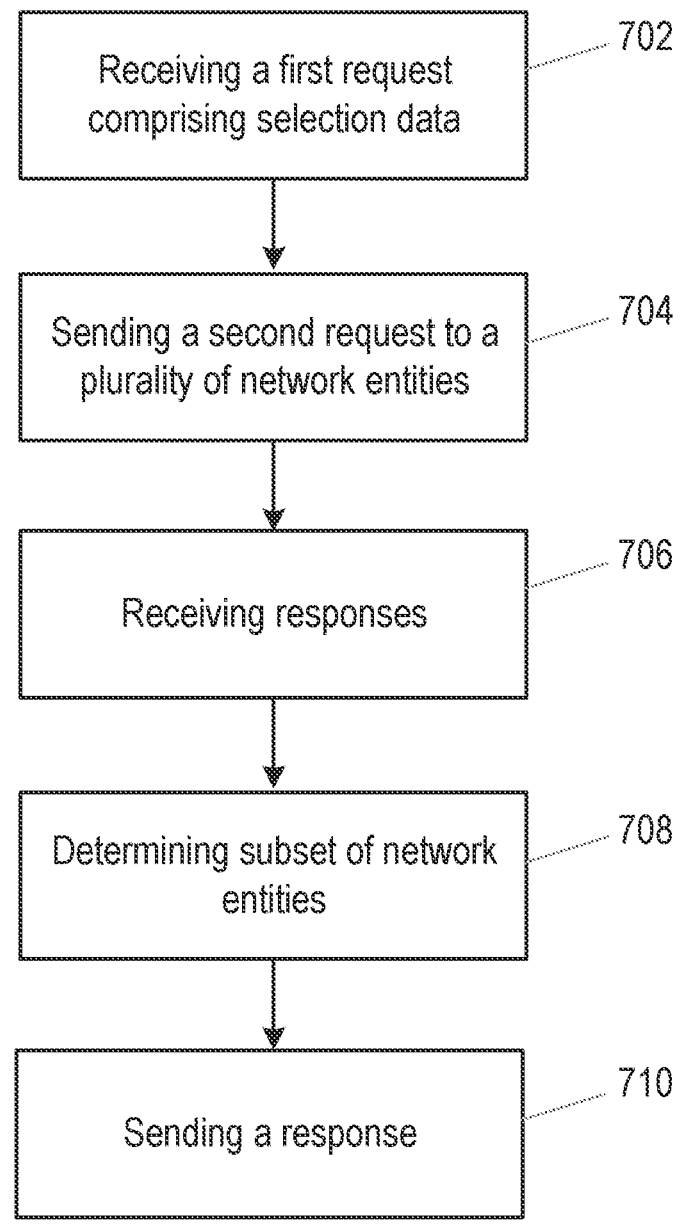
FIG. 7 is a flowchart of a method according to embodiments of the disclosure.

FIG. 7 is a flowchart of a method performed by a first network entity in a communications network according to embodiments of the disclosure. The first network entity may be, for example, an OAM (such as the OAM 312 described above in relation to FIG. 4, for example).

In step 702, the first network entity receives, from a co-ordination network entity in the communications network, a first request for a plurality of candidate network entities in the communication network. The candidate network entities may be configured to participate in collaborative learning. The co-ordination entity may be, for example, an NWDAF (such as the NWDAF 308 described above in relation to FIG. 3, for example). The first request comprises one or more selection criteria for selecting candidate network entities to participate in a collaborative learning process to train a model using a machine-learning algorithm. The one or more selection criteria may correspond substantially to the second selection criteria described above. Step 702 may correspond substantially to receipt of the second request message 404 described above with respect to FIG. 4, for example.

In step 704, the first network entity sends a second request comprising at least one of the one or more selection criteria to each of the plurality of candidate network entities. Thus, the network entity may, for each candidate network entity, transmit the second request directly to the candidate network entity, or, for example, the network entity may send the second request to the candidate network entity via another entity in the network. Step 704 may correspond substantially to transmission of the third request message 406 described above with respect to FIG. 4, for example.

In step 706, first network entity receives one or more first response messages and determines, based on the one or more first response messages, which of the plurality of candidate network entities satisfies the one or more selection criteria. In some embodiments, the first network entity may not receive a response message from candidate network entities that do not satisfy the at least one selection criteria, and the first network entity may thus determine (e.g. assume), from the absence of a response message from a candidate network entity, that the candidate network entity does not meet all of the at least one of the one or more selection criteria. Step 706 may correspond to receiving the second response message 408 described above with respect to FIG. 4, for example.

The first network entity may then proceed directly to step 710, in which the first network entity sends, to the co-ordination network entity, a second response message. The second response message may indicate which of the plurality of network entities satisfies the one or more selection criteria. The second response message may thus, for example, comprise identification information for only the network entities in the plurality of network entities that satisfy the one or more selection criteria. Alternatively, the second response message may comprise one or more indicators indicating which of the plurality of network entities satisfy the one or more selection criteria. Step 710 may correspond to transmitting the third response message 410 described above with respect to FIG. 4, for example.

Alternatively, the method may first proceed to step 708, in which the first network entity determines a subset of the candidate network entities that satisfy the one or more selection criteria. In particular embodiments, the first network entity may determine, based on the one or more first response messages, that two or more candidate network entities satisfy the one or more selection criteria. The first network entity may also have received (e.g. from the co-ordination network entity) or have been configured with a maximum number of network entities to report to the co-ordination entity. The first network entity may thus select a subset of the two or more candidate network entities and only indicate, to the co-ordination network entity that the subset of candidate network entities satisfies the one or more selection criteria.

The first network entity may select the subset of candidate network entities using any of the approaches described above in relation to FIG. 4 (e.g. at random, based on a characteristic of the candidate network entity etc.)

The method then proceeds to step 710, in which the first network entity sends, to the co-ordination network entity, the second response message. The second response message may indicate, to the co-ordination network entity, the subset of candidate network entities in the plurality of network entities. Thus the first network entity may indicate, to the co-ordination network entity that only the subset of candidate network entities satisfies the one or more selection criteria (e.g. there may be other candidate network entities that satisfy the selection criteria that are not indicated as satisfying the criteria in the second response message). The second response message may thus comprise, for example, identification information for each of the candidate network entities in the subset of candidate network entities. Step 710 may correspond to transmitting the third response message 410 described above with respect to FIG. 4, for example.

Figure 8:
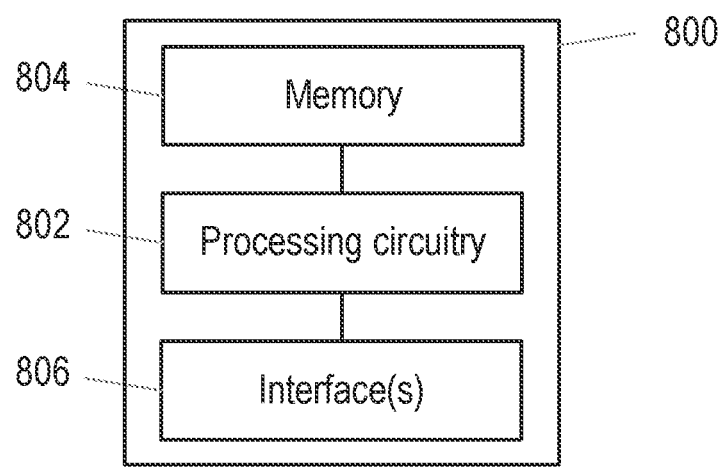
FIGS. 8 and 9 are schematic diagrams of an apparatus according to embodiments of the disclosure.

FIG. 8 is a schematic diagram of an apparatus 800 for a communication network (for example, the system 300 shown in FIG. 3) according to embodiments of the disclosure. The apparatus 800 may be implemented in a network function or entity (such as, for example, the NWDAF 308 described above in respect of FIG. 3). Apparatus 800 is operable to carry out the example method described with reference to FIG. 5 and possibly any other processes or methods disclosed herein. It is also to be understood that the method of FIG. 5 may not necessarily be carried out solely by apparatus 800. At least some operations of the method can be performed by one or more other entities.

The apparatus 800 comprises processing circuitry 802 (such as one or more processors, digital signal processors, general purpose processing units, etc), a machine-readable medium 804 (e.g., memory such as read-only memory (ROM), random-access memory, cache memory, flash memory devices, optical storage devices, etc) and one or more interfaces 806.

In one embodiment, the machine-readable medium 804 stores instructions which, when executed by the processing circuitry 802, cause the apparatus 800 to: obtain identification information for a plurality of candidate network entities in the communications network, the identification information indicating that each of the candidate network entities is configured to participate in collaborative learning; send a request for each of the candidate network entities, the request comprising one or more selection criteria; receive one or more response messages comprising an indication of which of the candidate network entities satisfy the one or more selection criteria; and based on the indication in the one or more response messages, select one or more of the plurality of candidate network entities to participate in a collaborative learning process to train a model using a machine learning algorithm.

In other embodiments, the processing circuitry 802 may be configured to directly perform the method, or to cause the apparatus 800 to perform the method, without executing instructions stored in the non-transitory machine-readable medium 804, e.g., through suitably configured dedicated circuitry.

The one or more interfaces 806 may comprise hardware and/or software suitable for communicating with other nodes of the wireless communication network using any suitable communication medium. For example, the interfaces 806 may comprise one or more wired interfaces, using optical or electrical transmission media. Such interfaces may therefore utilize optical or electrical transmitters and receivers, as well as the necessary software to encode and decode signals transmitted via the interface. In a further example, the interfaces 806 may comprise one or more wireless interfaces. Such interfaces may therefore utilize one or more antennas, baseband circuitry, etc. The components are illustrated coupled together in series; however, those skilled in the art will appreciate that the components may be coupled together in any suitable manner (e.g., via a system bus or suchlike).

In further embodiments of the disclosure, the apparatus 800 may comprise power circuitry (not illustrated). The power circuitry may comprise, or be coupled to, power management circuitry and is configured to supply the components of apparatus 800 with power for performing the functionality described herein. Power circuitry may receive power from a power source. The power source and/or power circuitry may be configured to provide power to the various components of apparatus 800 in a form suitable for the respective components (e.g., at a voltage and current level needed for each respective component). The power source may either be included in, or external to, the power circuitry and/or the apparatus 800. For example, the apparatus 800 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 9:
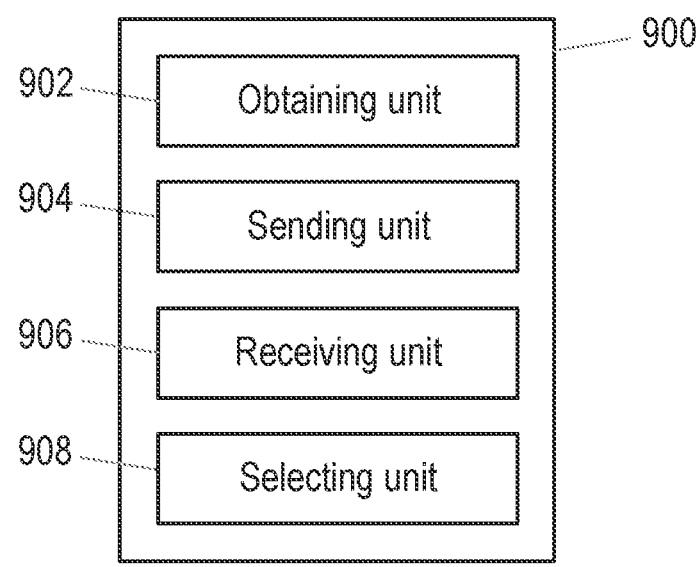

FIG. 9 is a schematic diagram of an apparatus 900 for a communication network (for example, the system 300 shown in FIG. 3) according to embodiments of the disclosure. The apparatus 900 may be implemented in a network entity or function (such as, for example, the NWDAF 308 describe above with respect to FIG. 4). Apparatus 900 is operable to carry out the example method described with reference to FIG. 5 and possibly any other processes or methods disclosed herein. It is also to be understood that the method of FIG. 5 may not necessarily be carried out solely by apparatus 900. At least some operations of the method can be performed by one or more other entities.

Apparatus 900 comprises an obtaining unit 902. The obtaining unit 902 is configured to obtain identification information for a plurality of candidate network entities in the communications network, in which the identification information indicates that each of the candidate network entities is configured to participate in collaborative learning. The apparatus 900 further comprises a sending unit 904, which is configured to send a request for each of the candidate network entities. The request comprises one or more selection criteria. The apparatus 900 further comprises a receiving unit 906 and a selecting unit 908. The receiving unit 906 is configured to receive one or more response messages comprising an indication of which of the candidate network entities satisfy the one or more selection criteria. The selecting unit 908 is configured to, based on the indication in the one or more response messages, select one or more of the plurality of candidate network entities to participate in a collaborative learning process to train a model using a machine learning algorithm.

Apparatus 900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause obtaining unit 902, sending unit 904, receiving unit 906, selecting unit 908, and any other suitable units of apparatus 900 to perform corresponding functions according one or more embodiments of the present disclosure.

Apparatus 900 may additionally comprise power-supply circuitry (not illustrated) configured to supply the apparatus 900 with power.

Figure 10:
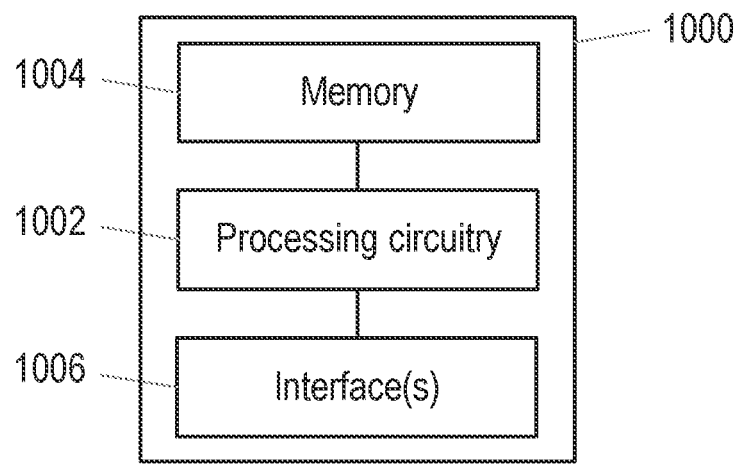
FIGS. 10 and 11 are schematic diagrams of an apparatus according to embodiments of the disclosure.

FIG. 10 is a schematic diagram of an apparatus 1000 for a communication network (for example, the system 300 shown in FIG. 3) according to embodiments of the disclosure. The apparatus 1000 may be implemented in a network function or entity (such as one of the network functions, 302 304, 306 described above with respect to FIG. 3). Apparatus 1000 is operable to carry out the example method described with reference to FIG. 6 and possibly any other processes or methods disclosed herein. It is also to be understood that the method of FIG. 6 may not necessarily be carried out solely by apparatus 1000. At least some operations of the method can be performed by one or more other entities.

The apparatus 1000 may belong to a plurality of entities configured to participate in collaborative learning. In particular embodiments, the apparatus 1000 may belong to a plurality of entities configured to perform collaborative learning to develop a model. Each entity of the plurality of entities may be configured to store a copy of the model, train the copy of the model based on data which is unique to the particular entity, and transmit an update for the model to a co-ordination network entity to be combined with other updates for the model.

The apparatus 1000 comprises processing circuitry 1002 (such as one or more processors, digital signal processors, general purpose processing units, etc), a machine-readable medium 1004 (e.g., memory such as read-only memory (ROM), random-access memory, cache memory, flash memory devices, optical storage devices, etc) and one or more interfaces 1006.

In one embodiment, the machine-readable medium 1004 stores instructions which, when executed by the processing circuitry 1002, cause the apparatus 1000 to: receive a request from a second network entity in the communications network, the request comprising one or more selection criteria for selecting network entities to participate in a collaborative learning process to train a model using a machine learning algorithm; and transmit, to the second network entity in the communications network, a response message comprising an indication of whether or not the first network entity satisfies the one or more selection criteria.

In other embodiments, the processing circuitry 1002 may be configured to directly perform the method, or to cause the apparatus 1000 to perform the method, without executing instructions stored in the non-transitory machine-readable medium 1004, e.g., through suitably configured dedicated circuitry.

The one or more interfaces 1006 may comprise hardware and/or software suitable for communicating with other nodes of the wireless communication network using any suitable communication medium. For example, the interfaces 1006 may comprise one or more wired interfaces, using optical or electrical transmission media. Such interfaces may therefore utilize optical or electrical transmitters and receivers, as well as the necessary software to encode and decode signals transmitted via the interface. In a further example, the interfaces 1006 may comprise one or more wireless interfaces. Such interfaces may therefore utilize one or more antennas, baseband circuitry, etc. The components are illustrated coupled together in series; however, those skilled in the art will appreciate that the components may be coupled together in any suitable manner (e.g., via a system bus or suchlike).

In further embodiments of the disclosure, the apparatus 1000 may comprise power circuitry (not illustrated). The power circuitry may comprise, or be coupled to, power management circuitry and is configured to supply the components of apparatus 1000 with power for performing the functionality described herein. Power circuitry may receive power from a power source. The power source and/or power circuitry may be configured to provide power to the various components of apparatus 1000 in a form suitable for the respective components (e.g., at a voltage and current level needed for each respective component). The power source may either be included in, or external to, the power circuitry and/or the apparatus 1000. For example, the apparatus 1000 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 11:
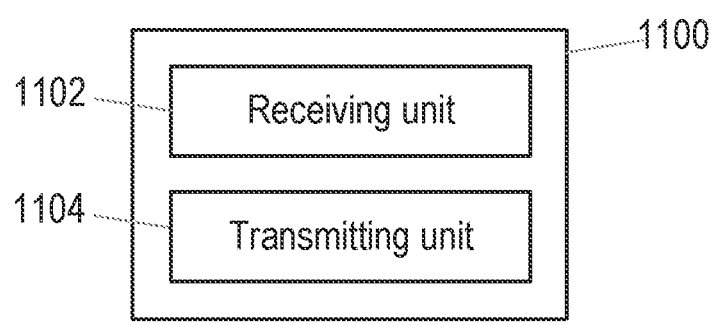

FIG. 11 is a schematic diagram of an apparatus 1100 for a communication network (for example, the system 300 shown in FIG. 3) according to embodiments of the disclosure. The apparatus 1100 may be implemented in a network function or entity (such as one of the network functions, 302 304, 306 described above with respect to FIG. 3). Apparatus 1100 is operable to carry out the example method described with reference to FIG. 6 and possibly any other processes or methods disclosed herein. It is also to be understood that the method of FIG. 6 may not necessarily be carried out solely by apparatus 1100. At least some operations of the method can be performed by one or more other entities.

The apparatus 1100 may belong to a plurality of entities configured to participate in collaborative learning. In particular embodiments, the apparatus 1100 may belong to a plurality of entities configured to perform collaborative learning to develop a model. Each entity of the plurality of entities may be configured to store a copy of the model, train the copy of the model based on data which is unique to the particular entity, and transmit an update for the model to a co-ordination network entity to be combined with other updates for the model.

As illustrated in FIG. 11, apparatus 1100 includes receiving unit 1102 and transmitting unit 1104. The receiving unit 1102 is configured to receive a request from a second network entity in the communications network, the request comprising one or more selection criteria for selecting network entities to participate in a collaborative learning process to train a model using a machine learning algorithm. The transmitting unit 1104 is configured to transmit, to the second network entity in the communications network, a response message comprising an indication of whether or not the first network entity satisfies the one or more selection criteria Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1102, transmitting unit 1104, and any other suitable units of apparatus 1100 to perform corresponding functions according one or more embodiments of the present disclosure.

Apparatus 1100 may additionally comprise power-supply circuitry (not illustrated) configured to supply the apparatus 1100 with power.

Figure 12:
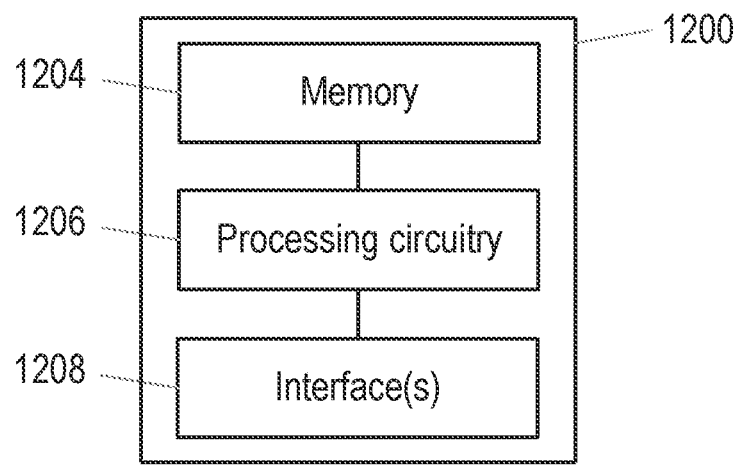
FIGS. 12 and 13 are schematic diagrams of an apparatus according to embodiments of the disclosure.

FIG. 12 is a schematic diagram of an apparatus 1200 for a communication network (for example, the system 300 shown in FIG. 3) according to embodiments of the disclosure.

The apparatus 1200 may be implemented in a network function or entity (such as, for example, the OAM 312 described above with respect to FIG. 4). Apparatus 1200 is operable to carry out the example method described with reference to FIG. 7 and possibly any other processes or methods disclosed herein. It is also to be understood that the method of FIG. 7 may not necessarily be carried out solely by apparatus 1200. At least some operations of the method can be performed by one or more other entities.

The apparatus 1200 comprises processing circuitry 1206 (such as one or more processors, digital signal processors, general purpose processing units, etc), a machine-readable medium 1204 (e.g., memory such as read-only memory (ROM), random-access memory, cache memory, flash memory devices, optical storage devices, etc) and one or more interfaces 1208.

In one embodiment, the machine-readable medium 1204 stores instructions which, when executed by the processing circuitry 1206, cause the apparatus 1200 to: receive, from a co-ordination network entity in the communications network, a first request for a plurality of candidate network entities in the communication network, wherein the first request comprises one or more selection criteria for selecting candidate network entities to participate in a collaborative learning process to train a model using a machine-learning algorithm. The apparatus 1200 is further caused to: send a second request comprising at least one of the one or more selection criteria to each of the plurality of candidate network entities; determine, based on one or more first response messages, which of the plurality of candidate network entities satisfies the one or more selection criteria; and send, to the co-ordination network entity an indication of which of the plurality of candidate network entities satisfies the one or more selection criteria.

In other embodiments, the processing circuitry 1206 may be configured to directly perform the method, or to cause the apparatus 1200 to perform the method, without executing instructions stored in the non-transitory machine-readable medium 1204, e.g., through suitably configured dedicated circuitry.

The one or more interfaces 1208 may comprise hardware and/or software suitable for communicating with other nodes of the wireless communication network using any suitable communication medium. For example, the interfaces 1208 may comprise one or more wired interfaces, using optical or electrical transmission media. Such interfaces may therefore utilize optical or electrical transmitters and receivers, as well as the necessary software to encode and decode signals transmitted via the interface. In a further example, the interfaces 1208 may comprise one or more wireless interfaces. Such interfaces may therefore utilize one or more antennas, baseband circuitry, etc. The components are illustrated coupled together in series; however, those skilled in the art will appreciate that the components may be coupled together in any suitable manner (e.g., via a system bus or suchlike).

In further embodiments of the disclosure, the apparatus 1200 may comprise power circuitry (not illustrated). The power circuitry may comprise, or be coupled to, power management circuitry and is configured to supply the components of apparatus 1200 with power for performing the functionality described herein. Power circuitry may receive power from a power source. The power source and/or power circuitry may be configured to provide power to the various components of apparatus 1200 in a form suitable for the respective components (e.g., at a voltage and current level needed for each respective component).

The power source may either be included in, or external to, the power circuitry and/or the apparatus 1200. For example, the apparatus 1200 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Figure 13:
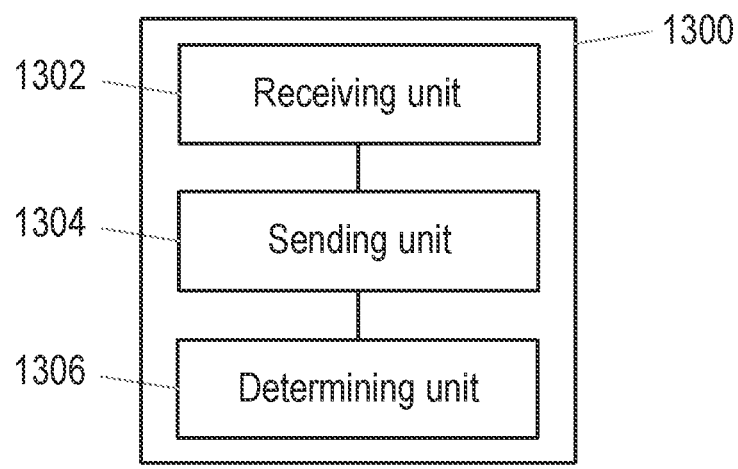

FIG. 13 is a schematic diagram of an apparatus 1300 for a communication network (for example, the system 300 shown in FIG. 3) according to embodiments of the disclosure. The apparatus 1300 may be implemented in a network function or entity (such as, for example, the OAM 312 described above in respect of FIG. 4). Apparatus 1300 is operable to carry out the example method described with reference to FIG. 7 and possibly any other processes or methods disclosed herein. It is also to be understood that the method of FIG. 7 may not necessarily be carried out solely by apparatus 1300. At least some operations of the method can be performed by one or more other entities.

As illustrated in FIG. 13, apparatus 1300 includes a receiving unit 1302, a sending unit 1304 and a determining unit 1306. The receiving unit is configured to receive, from a co-ordination network entity in the communications network, a first request for a plurality of candidate network entities in the communication network, wherein the first request comprises one or more selection criteria for selecting candidate network entities to participate in a collaborative learning process to train a model using a machine-learning algorithm. The sending unit 1304 is configured to send a second request comprising at least one of the one or more selection criteria to each of the plurality of candidate network entities. The determining unit 1306 is configured to determine, based on one or more first response messages, which of the plurality of candidate network entities satisfies the one or more selection criteria. The sending unit 1304 is further configured to send, to the co-ordination network entity an indication of which of the plurality of candidate network entities satisfies the one or more selection criteria.

Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1302, sending unit 1304, determining unit 1306 and any other suitable units of apparatus 1300 to perform corresponding functions according one or more embodiments of the present disclosure.

Apparatus 1300 may additionally comprise power-supply circuitry (not illustrated) configured to supply the apparatus 1300 with power.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Aspects of the present disclosure therefore allow for to reducing latency, minimising resource overhead and reducing the risk of security problems by implementing machine-learning in communication networks. In particular, the embodiments described herein provide an efficient for selecting network entities to perform a collaborative learning process, thereby providing a more reliable method for performing collaborative learning in a communications network.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfil the functions of several units recited in the statements. Any reference signs in the statements shall not be construed so as to limit their scope.

The invention claimed is:

1. A method performed by a first network entity in a communications network, the first network entity belonging to a plurality of network entities configured to participate in collaborative learning, the method comprising:
   receiving a request from a second network entity in the communications network, the request comprising one or more selection criteria for selecting candidate network entities to participate in a collaborative learning process to train a model using a machine learning algorithm; and
   transmitting, to the second network entity in the communications network, a response message comprising an indication of whether or not the first network entity satisfies the one or more selection criteria,
   wherein the one or more selection criteria comprise a criterion relating to a configuration of a candidate network entity among a plurality of candidate network entities in the communications network, a criterion relating to performance requirements for the candidate network entity, a criterion relating to availability of training data at the candidate network entity for training the model, and a criterion relating to a property of training data available at the candidate network entity, wherein the candidate network entity comprises at least one of an Access and mobility Management Function (AMF), Authentication Server Function (AUSF), Session Management Function (SMF), Policy Charging Function (PCF), Unified Data Management (UDM), Operations Administration and Management (OAM), and evolved NodeB (eNB), and a next generation NodeB (gNB).

2. A network entity for a communications network, the network entity comprising processing circuitry and a non-transitory machine-readable medium storing instructions which, when executed by the processing circuitry, cause the network entity to perform operations comprising:
  obtaining identification information for a plurality of candidate network entities in the communications network, the identification information indicating that the candidate network entities are configured to participate in collaborative learning;
  sending a request for the candidate network entities, the request comprising one or more selection criteria;
  receiving one or more response messages comprising an indication of which of the candidate network entities satisfy the one or more selection criteria; and
  based on the indication in the one or more response messages, selecting one or more of the plurality of candidate network entities to participate in a collaborative learning process to train a model using a machine learning algorithm,
  wherein the one or more selection criteria comprise a criterion relating to a configuration of a candidate network entity among the plurality of candidate network entities in the communications network, a criterion relating to performance requirements for the candidate network entity, a criterion relating to availability of training data at the candidate network entity for training the model, and a criterion relating to a property of training data available at the candidate network entity, wherein the selected one or more of the plurality of candidate network entities includes at least one of an Access and mobility Management Function (AMF), Authentication Server Function (AUSF), Session Management Function (SMF), Policy Charging Function (PCF), Unified Data Management (UDM), Operations Administration and Management (OAM), evolved NodeB (eNB), and a next generation NodeB (gNB).

3. The network entity of claim 2, wherein the one or more selection criteria comprise a criterion relating to one or more metrics indicative of a performance of a preliminary model obtained by training the model at the candidate network entity using the machine learning algorithm.

4. The network entity of claim 3, wherein sending a request for the candidate network entities comprises initiating, at the candidate network entities, training of the model to obtain the preliminary model.

5. The network entity of claim 2, wherein sending a request for the candidate network entities comprises sending a request for the candidate network entities to an operations, administration and maintenance, OAM, entity in the communications network.

6. The network entity of claim 5, wherein the request further comprises a maximum number of candidate network entities to be selected by the OAM for participating in the collaborative learning process, and the one or more response messages comprise an indication for only a subset of the plurality of candidate network entities.

7. The network entity of claim 2, wherein the network entity is further caused to perform operations comprising:
  receive, for at least one candidate network entity in the plurality of candidate network entities, one or more participation criteria for participating in the collaborative learning process, wherein selection of the one or more of the plurality of candidate network entities to participate in the collaborative learning process is further based on whether or not the one or more participation criteria are satisfied.

8. The network entity of claim 7, wherein the one or more participation criteria are comprised in at least one of the one or more response messages.

9. The network entity of claim 7, wherein the one or more participation criteria for the at least one candidate network entity relate to one or more of the following:
  a network slice operated on by the network entity; and
  a threshold number of candidate network entities participating in the collaborative learning process.

10. The network entity of claim 2, wherein one or more of the following apply:
  the network entity is a network data analytics function, NWDAF; and
  the network entity is in a core network of a communications network.

11. A first network entity for a communications network, the first network entity belonging to a plurality of network entities configured to participate in collaborative learning, the first network entity comprising processing circuitry and a non-transitory machine-readable medium storing instructions which, when executed by the processing circuitry, cause the first network entity to perform operations comprising:
  receiving a request from a second network entity in the communications network, the request comprising one or more selection criteria for selecting candidate network entities to participate in a collaborative learning process to train a model using a machine learning algorithm; and
  transmitting, to the second network entity in the communications network, a response message comprising an indication of whether or not the first network entity satisfies the one or more selection criteria,
  wherein the one or more selection criteria comprise a criterion relating to a configuration of a candidate network entity among a plurality of candidate network entities in the communications network, a criterion relating to performance requirements for the candidate network entity, a criterion relating to availability of training data at the candidate network entity for training the model, and a criterion relating to a property of training data available at the candidate network entity, wherein the candidate network entity comprises at least one of an Access and mobility Management Function (AMF), Authentication Server Function (AUSF), Session Management Function (SMF), Policy Charging Function (PCF), Unified Data Management (UDM), Operations Administration and Management (OAM), and evolved NodeB (eNB), and a next generation NodeB (gNB).

12. The first network entity of claim 11, wherein the one or more selection criteria comprise a criterion relating to one or more metrics indicative of a performance of a preliminary model obtained at the first network entity by training the model using the machine learning algorithm.

13. The first network entity of claim 12, wherein the first network entity is further caused to perform operations comprising: in response to receipt of the request, obtain the preliminary model by training the model using the machine learning algorithm.

14. The first network entity of claim 12, wherein the first network entity is further caused to perform operations comprising:
  obtain values of the one or more metrics for the preliminary model; and
  compare the obtained values to the at least one of the one or more selection criteria.

15. The first network entity of claim 11, wherein the response message further comprises one or more participation criteria for participating in the collaborative learning process.

16. The first network entity of claim 15, wherein the one or more participation criteria relate to one or more of the following:
- a network slice operated on by the second network entity; and
- a threshold number of other network entities participating in the collaborative learning process.

17. The first network entity of claim 11, wherein at least one of the following apply:
- the second network entity is a network data analytics function, NWDAF, or an operations, administration and maintenance, OAM, entity; and
- at least one of the first network entity and the second network entity are in a core network of a communications network.

18. A system in a communications network, the system comprising a first network entity, and a plurality of second network entities configured to participate in collaborative learning, wherein the first network entity comprises processing circuitry and a non-transitory machine-readable medium storing instructions which, when executed by the processing circuitry, cause the first network entity to perform operations comprising:
- obtaining identification for the plurality of second network entities, the identification information indicating that the second network entities are configured to participate in collaborative learning; and
- sending a request for the second network entities, the request comprising one or more selection criteria, wherein the second network entities are further configured to receive the request, wherein one or more of the second network entities are configured to
- transmit a response message comprising an indication of whether or not the respective second network entity satisfies the one or more selection criteria, wherein the first network entity is further configured to
- receive the one or more response messages, and
- based on the indication in the one or more response messages, select one or more of the plurality of second network entities to participate in a collaborative learning process to train a model using a machine learning algorithm, and wherein the one or more selection criteria comprise a criterion relating to a configuration of a second network entity among the plurality of second network entities in the communications network, a criterion relating to performance requirements for the second network entity, a criterion relating to availability of training data at the second network entity for training the model, and a criterion relating to a property of training data available at the second network entity, wherein the second network entity includes at least one of an Access and mobility Management Function (AMF), Authentication Server Function (AUSF), Session Management Function (SMF), Policy Charging Function (PCF), Unified Data Management (UDM), Operations Administration and Management (OAM), evolved NodeB (eNB), and a next generation NodeB (gNB).

* * * * *